United States Patent [19]

Landford

[11] Patent Number: 4,978,159
[45] Date of Patent: Dec. 18, 1990

[54] AUTOMOTIVE GLARE SHIELD

[76] Inventor: Bette W. Landford, 16967 Joshua St., Hesperia, Calif. 92345

[21] Appl. No.: 459,203

[22] Filed: Dec. 29, 1989

[51] Int. Cl.⁵ ............................................. B60J 3/00
[52] U.S. Cl. .................................. 296/97.6; 296/97.7; 296/97.2
[58] Field of Search ..................... 296/97.6, 97.7, 97.8, 296/97.2

[56] References Cited

U.S. PATENT DOCUMENTS

| | | | |
|---|---|---|---|
| D. 157,425 | 2/1950 | Diwczynski et al. | D12/191 |
| 1,263,030 | 4/1918 | Brown et al. | 248/205.7 |
| 1,717,185 | 6/1929 | Caldwell | 248/286 |
| 2,681,825 | 6/1954 | De Lyra | 296/97.1 |
| 2,715,043 | 8/1955 | Schewel | 296/97.7 |
| 2,863,697 | 12/1958 | Watkins | 296/97.1 |
| 3,336,072 | 8/1967 | Leonard | 296/97.8 |
| 3,515,427 | 6/1970 | Van Sickle | 296/97.6 |
| 3,948,554 | 4/1976 | Barbee | 296/97.6 |
| 4,058,340 | 11/1977 | Pinkas | 296/97.6 |
| 4,167,287 | 9/1976 | Franklin et al. | 296/97.6 |

*Primary Examiner*—Robert R. Song
*Attorney, Agent, or Firm*—Leon Gilden

[57] ABSTRACT

An apparatus comprising a unitary planar shield including an upper rectangular sheet and including an integral planar handle, wherein the shield is formed of a photochromic polymeric material for darkening reaction to available light. The apparatus includes a kit for selectively mounting the shield throughout the vehicle comprising a forward "L" shaped support securable a top edge of the shield and a rear support securable to a rear edge of the shield to suspend the shield relative to an associated automotive visor, wherein the kit further includes a plurality of suction cup members securable to the handle for positioning the shield onto the associated automotive windshield.

3 Claims, 4 Drawing Sheets

U.S. Patent    Dec. 18, 1990    Sheet 1 of 4    4,978,159
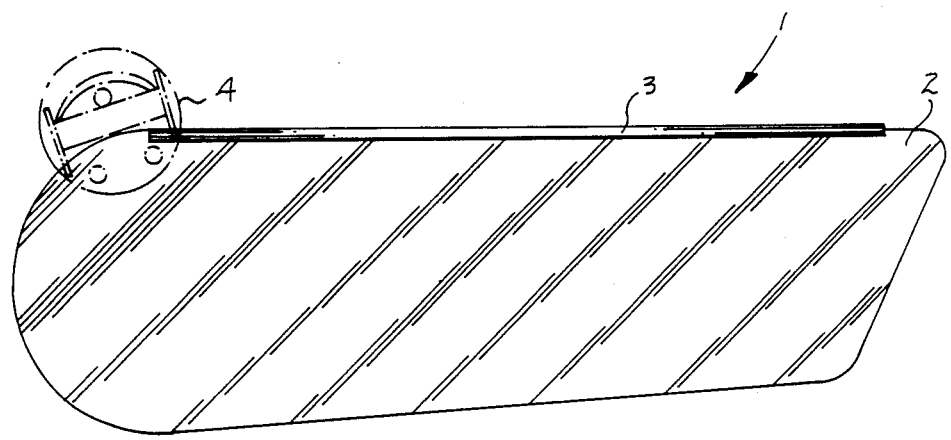
FIG 1
PRIOR ART
FIG 2
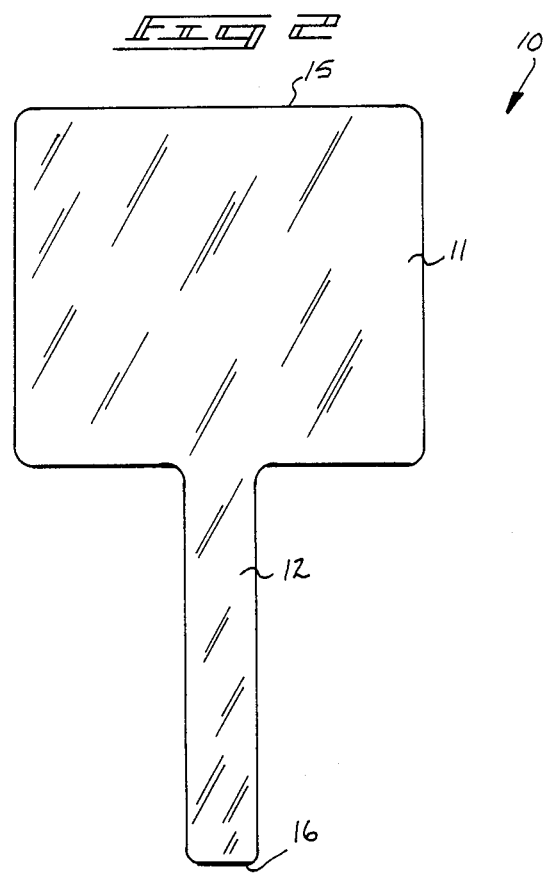

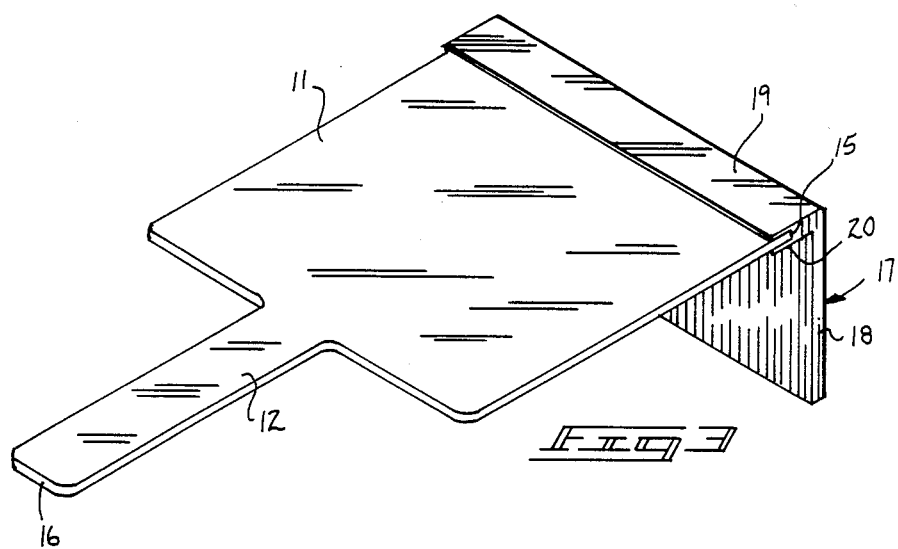
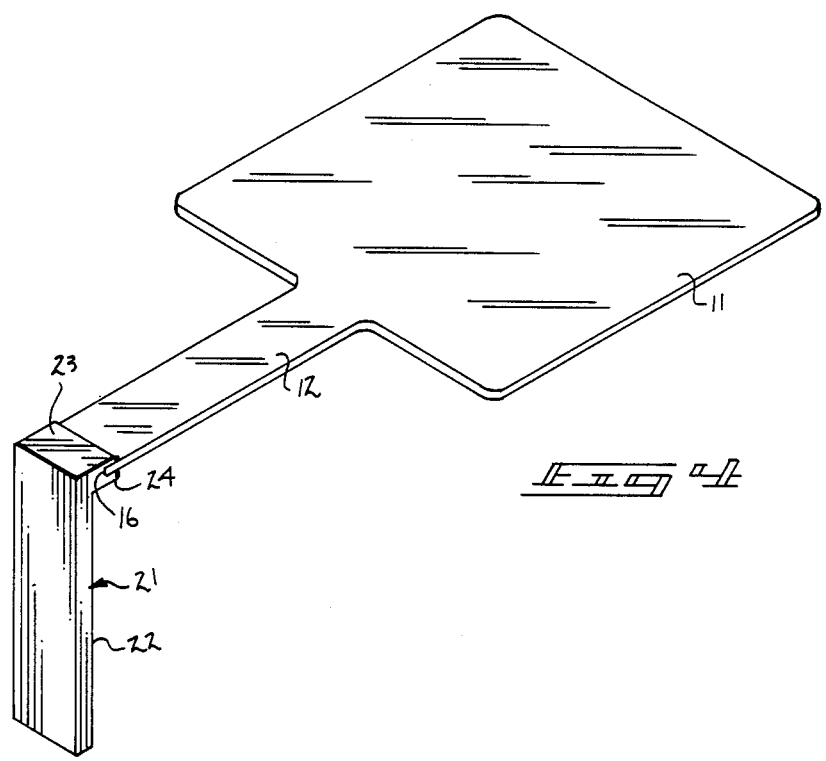

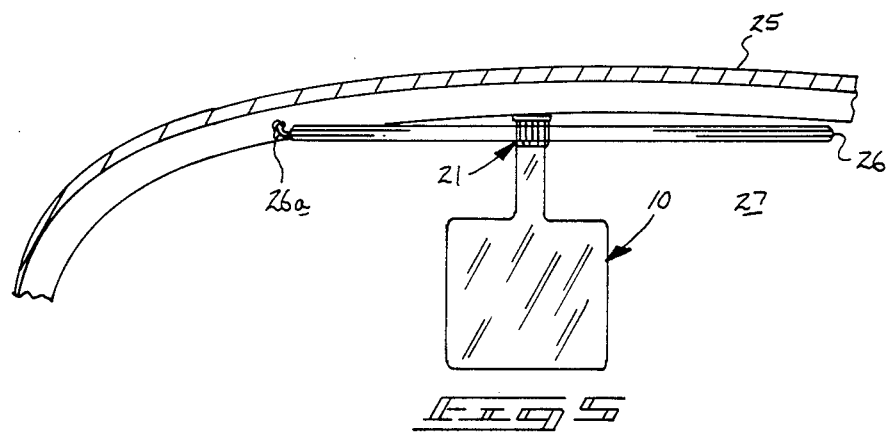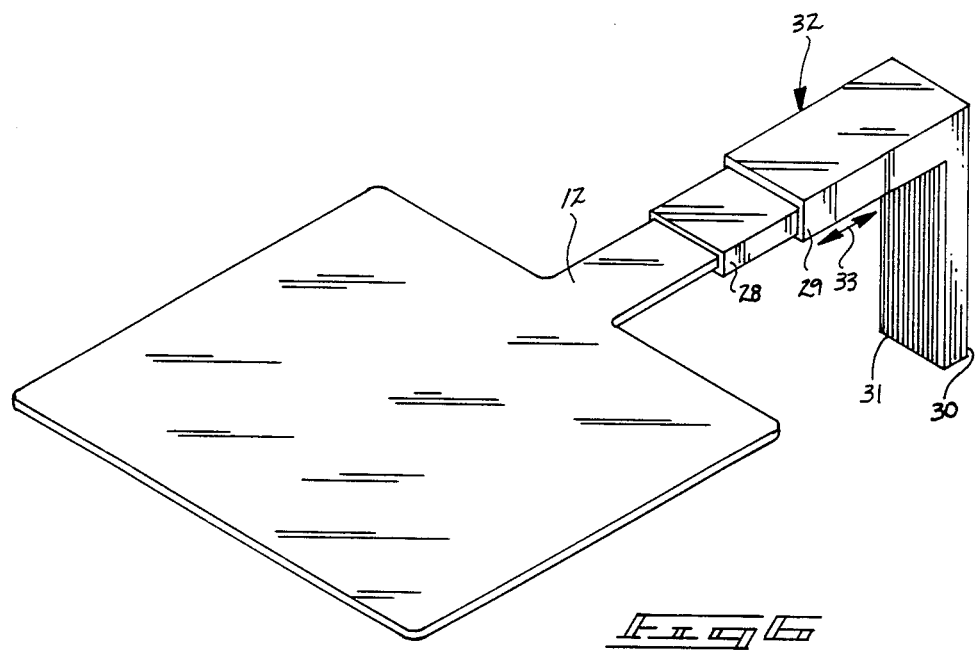

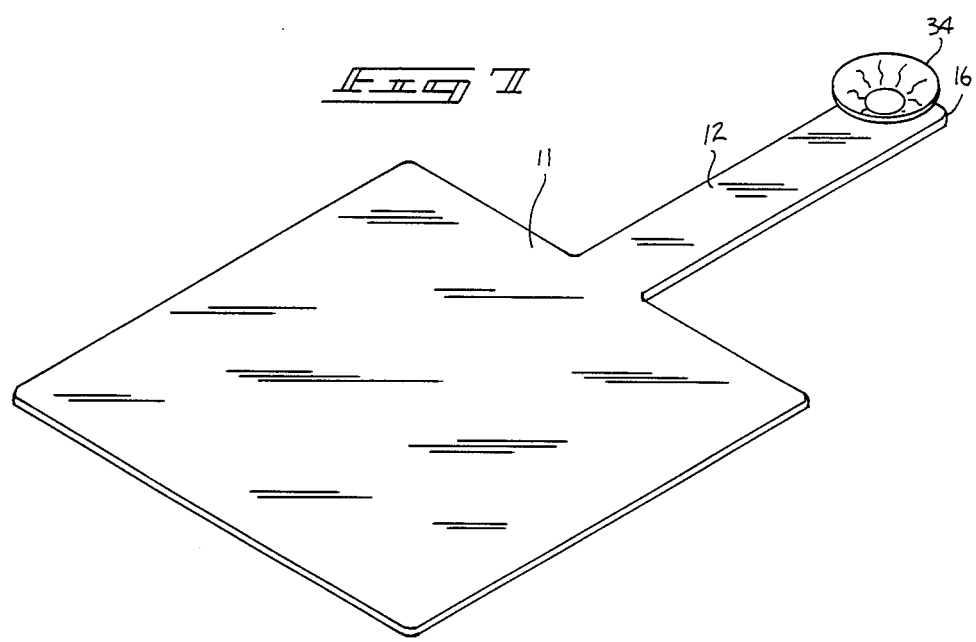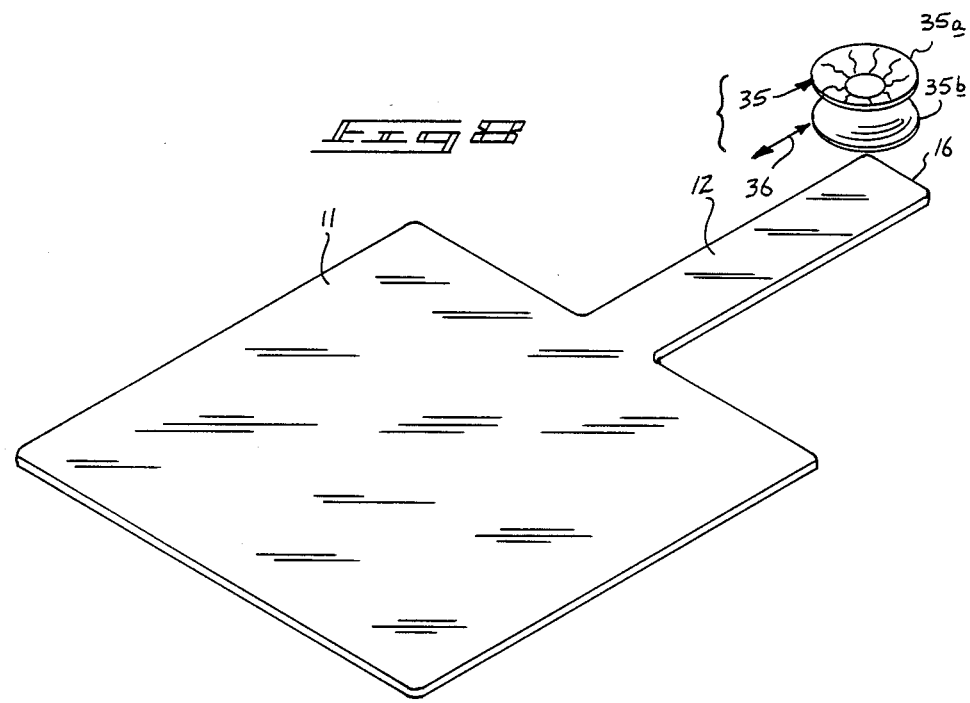

AUTOMOTIVE GLARE SHIELD

BACKGROUND OF THE INVENTION

1. Field of the Invention

The field of invention relates to automotive glare shields, and more particularly pertains to a new and improved automotive glare shield kit wherein the same comprises a unitary manually manipulatable shield including an assemblage of mounting members for conveniently positioning a shield throughout an automotive interior compartment.

2. Description of the Prior Art

Automotive devices utilized by individuals, particularly the driver of an automobile to provide shielding against glare and excessive light interiorly of an automotive compartment, have been widely used in the prior art. Typically, such devices have tended to be oriented and fixedly mounted in predetermined positions throughout an automotive interior. An example of such a device may be found in U.S. Design Pat. No. 157,425 to Piwczynski wherein an elongate, planar type shield is mounted to a member for ultimate securement interiorly of an automotive windshield and the like.

U.S. Pat. No. 1,263,030 to Brown, et al., sets forth a shield with a medially positioned suction cup for securement to an automotive windshield with a surrounding glare shield providing a degree of glare protection to an associated driver.

U.S. Pat. No. 2,863,697 to Watkins sets forth a vehicular glare shield wherein the same is securable in overlying relationship to an interior portion of an automotive windshield to provide a degree of eye protection to a driver of the vehicle.

U.S. Pat. No. 2,681,825 to Lyra sets forth a glare shield for use with an automobile, wherein the shield includes a rotatable member mounted to a framework of an associated sun visor.

U.S. Pat. No. 1,717,185 to Caldwell sets forth a shield that is suspendingly mounted from a bracket secured to an interior portion of an automobile, wherein the bracket enables pivotment and telescoping relationship of the shield relative to the windshield.

As such, it may be appreciated that there is a continuing need for a new and improved automotive glare shield kit wherein the same enables selective securement of the shield to predetermined portions of an automotive interior during use.

SUMMARY OF THE INVENTION

In view of the foregoing disadvantages inherent in the known types of automotive glare shields now present in the prior art, the present invention provides an automotive glare shield kit wherein the same provides for a planar manually manipulated and selectively securable about various interior portions of an automobile. As such, the general purpose of the present invention, which will be described subsequently in greater detail, is to provide a new and improved automotive glare shield kit which has all the advantages of the prior art automotive glare shields and none of the disadvantages.

To attain this, the present invention includes an apparatus comprising a unitary planar shield including an upper rectangular sheet and including an integral planar handle, wherein the shield is formed of a photo-chromic polymeric material for darkening reaction to available light. The apparatus includes a kit for selectively mounting the shield throughout the vehicle comprising a forward "L" shaped support securable a top edge of the shield and a rear support securable to a rear edge of the shield to suspend the shield relative to an associated automotive visor, wherein the kit further includes a plurality of suction cup members securable to the handle for positioning the shield onto the associated automotive windshield.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, method and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive glare shield which has all the advantages of the prior art automotive glare shields and none of the disadvantages.

It is another object of the present invention to provide a new and improved automotive glare shield which may be easily and efficiently manufactured and marketed.

It is a further object of the present invention to provided a new and improved automotive glare shield which is of a durable and reliable construction.

An even further object of the present invention is to provide a new and improved automotive glare shield which is susceptible of a low cost of manufacture with regard to both materials and labor, and which accordingly is then susceptible of low prices of sale to the consuming public, thereby making such automotive glare shields economically available to the buying public.

Still yet another object of the present invention is to provide a new and improved automotive glare shield which provides in the apparatuses and methods of the prior art some of the advantages thereof, while simultaneously overcoming some of the disadvantages normally associated therewith.

Still another object of the present invention is to provide a new and improved automotive glare shield wherein the same is selectively securable to various interior portions of an automotive interior compartment during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art automotive glare shield.

FIG. 2 is an orthographic plan view of the instant invention.

FIG. 3 is an isometric illustration of the instant invention with a forwardly secured hanger.

FIG. 4 is an isometric illustration of the instant invention with a rearwardly secured hanger.

FIG. 5 is an orthographic view taken in elevation of the instant invention, as illustrated in FIG. 4, in association with an automotive visor.

FIG. 6 is an isometric illustration of the instant invention in association with a telescoping rear hanger.

FIG. 7 is an isometric illustration of the instant invention securable with a suction cup member.

FIG. 8 is an isometric illustration of the instant invention securable with a double-sided suction cup member.

DESCRIPTION OF THE PREFERRED EMBODIMENT

With reference now to the drawings, and in particular to FIGS. 1 to 8 thereof, a new and improved automotive glare shield kit embodying the principles and concepts of the present invention and generally designated by the reference numeral 10 will be described.

Attention to FIG. 1 is illustrative of a typical prior art automotive shield 1 defined by a transparent darkened lens 2 secured to an elongate frame 3 that in turn is mounted to a mount member 4 to secure the organization to an interior portion of an automotive environment.

FIG. 2 is illustrative of the automotive glare shield that is defined along a common plane including a planar sheet 11 with an integral handle 12 extending orthogonally relative to a bottom edge of the sheet 11. The planar sheet 11 and handle 12 are formed preferably of a photo-chromic polymeric material to enable the shield to darken in response to available light. The planar upper sheet 11 is defined by a top edge defined by a first length and a bottom edge 16 parallel to the top edge 15 defined by a secure length, wherein the bottom edge 16 defines the lower terminal end of the handle 12.

FIG. 3 illustrates a further member of the kit defined as a forward "L" shaped polymeric hanger 17 coextensively mounted to the top edge 15 and including a first forward leg 18 orthogonally mounted to a shorter forward leg 19 that includes a "U" shaped resilient groove 20 to fixedly receive the top edge 15 therewithin.

FIG. 4 illustrates the rear "L" shaped polymeric hanger 21 mounted to the bottom edge 16 that includes a first rear leg 22 orthogonally and intergally mounted to a second rear leg 23 where the width of the rear legs 22 and 23 are equal to the second length defined by the bottom edge 16. A rear "U" shaped groove 24 is formed within a forward surface of the second rear leg 23 to receive the aforenoted edge 16 therewithin in a fixedly secure manner. The FIG. 5 is illustrative of the use of the rear "L" shaped hanger 21 positioned over an automotive visor 26 pivotally mounted to a pivot means 26c overlying the associated windshield 27. In use of the forward "L" shaped hanger 17, it may understood that the first leg 18 may be positioned over the visor 26 in use to help position and stabilize the shield 10 thereto.

It is advantageous at times to utilize a telescoping hanger wherein typically a telescoping hanger 32 is mounted to the handle 12 and includes a first sleeve 28 fixedly receiving the handle 12 therewithin, wherein the first sleeve 28 is reciprocatably mounted within a second sleeve 29 in the direction of the arrow 33, as illustrated in FIG. 6. A vertical support leg 30 is integrally and orthogonally mounted to the second sleeve 29 and is formed with a ribbed forward surface 31 orthogonally oriented relative to the handle 12 confronting the handle 12 to enhance frictional engagement with the visor 26, as illustrated in FIG. 5.

FIG. 7 illustrates the use of a fixedly mounted suction cup 34 mounted to the handle 12 adjacent the bottom edge 16 for securement to the windshield 27 in use. Alternatively, a suction cup member 35 including coaxially aligned suction cups 35a and 35b are formed in back-to-back relationship and are of a diameter less than that of the second length defined by the handle 12 to enable positioning of one of the first and second suction cups 35a or 35b to the handle surface 12 for securement to the automotive windshield 27 to enable adjustable positioning of the handle 12 and the associated planar sheet 11 relative to teh windshield. It should also be understood that the suction cup member 35, as well as the forward hanger 17, as well as the rear hanger 21, or alternatively the modified rear hanger 32, may be utilized in combination with the suction cups to enable ease of positioning of the shield 10 within the automotive interior.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive glare shield kit apparatus for selective positioning within an automobile interior, the interior including a windshield and a visor member mounted overlying the windshield, the apparatus comprising, a planar shield including a rectangular upper member and elongate handle member orthogonally and integrally formed to a lower edge of the upper member, the upper member including a top edge defined by a first length, the handle terminating remotely from the upper member and a bottom edge oriented parallel to the top edge, the bottom edge defined by a second length, the planar shield formed of a photo-chromatic polymeric material to darken in response to available light, and including a first hanger means securable to the top edge, the hanger means including an "L" shaped member formed with a first leg oriented orthogonally relative to the shield and a second leg orthogonally oriented relative to the first leg, the second leg including an elongate "U" shaped resilient groove to receive the top edge therewithin, the second leg defined by a second length equal to the first length to secure the second leg coextensively to the top edge.

2. An apparatus as set forth in claim 1 further including a second hanger means for securement to the bottom edge, the second hanger means including a vertical leg oriented orthogonally relative to the shield and a horizontal leg integrally mounted to the vertical leg, the horizontal leg including a resilient second hanger "U" shaped slot for securement of the bottom edge therewithin, and the horizontal leg defined by a width equal to the second length.

3. An apparatus as set forth in claim 1 including a second hanger means for securement to the handle, the second hanger means including a defined cavity to receive the handle complementarily therewithin, and a second sleeve slidingly and telescopingly receiving the first sleeve therewithin, and a vertical leg orthogonally and fixedly mounted to the second sleeve, the second sleeve including a ribbed forward face for frictional engagement with the visor when positioned thereon, the ribbed forward face oriented in confronting relationship relative to the shield.

* * * * *